April 11, 1950        W. A. RAY        2,503,563
VALVE OPERATOR
Filed Sept. 30, 1944
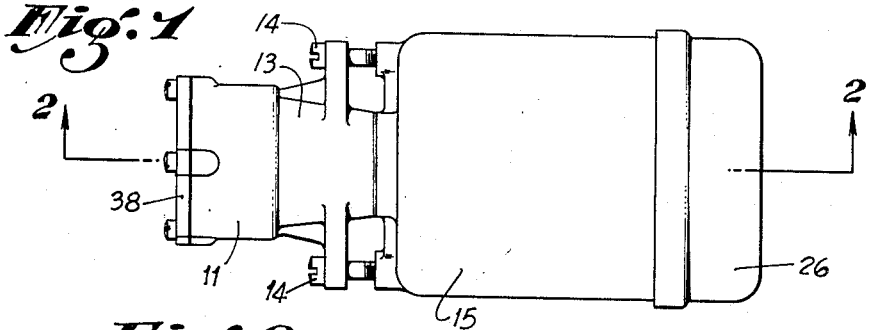
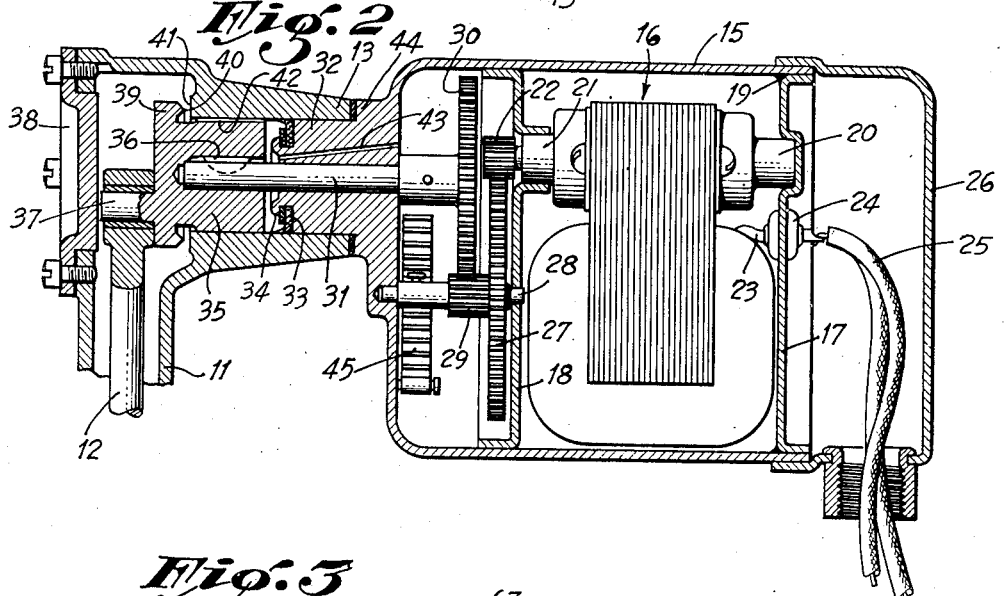
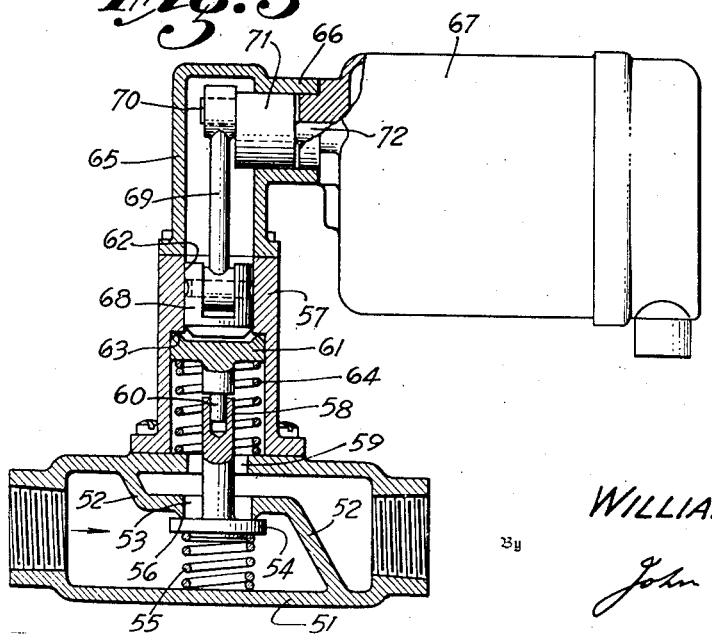
Inventor:
WILLIAM A. RAY,
By John H. Rouse,
Attorney.

Patented Apr. 11, 1950

2,503,563

UNITED STATES PATENT OFFICE 2,503,563

VALVE OPERATOR

William A. Ray, Los Angeles, Calif., assignor to General Controls Co., a corporation Application September 30, 1944, Serial No. 556,613

8 Claims. (Cl. 137—139)

My present invention relates to means for operating fluid control valves and more particularly to means for removably connecting the operator to the valve; a main object of the invention being to prevent escape of the fluid controlled by the valve when the operator is removed.

While obviously not so limited, the invention has particular utility in connection with valves employed in refrigerating systems, since if fluid were lost in the removal or replacement of the operator it would be necessary to recharge the system.

In refrigerating systems, the use of a conventional gland of the packed type is prohibited because of the danger of leakage. Further, seals of the bellows type are unsatisfactory partly because of possibility of rupture of the bellows and also because of the excessive head pressure effect produced by that type of seal. It is therefore another object of this invention to provide packless and non-rupturable means for sealing the opening in the valve casing through which the operator is connected to the valve mechanism.

Another object is to provide means for transmitting the force of the operator to the valve, which means when the operator is removed forms a closure for the opening provided in the valve casing for the operator.

Another object is to provide means, of the character described in the preceding object, whereby fluid communication between the valve and the operator is established when the operator is attached or when it is then energized.

Other objects and advantages of the invention will be found in the description, the drawing, and the claims; and, for full understanding of the invention, reference is to be had to the following detailed description and accompanying drawing, wherein:

Figure 1 is a plan of a motor-operated valve embodying the invention;

Figure 2 is a fragmentary section taken along the line 2—2 of Fig. 1; and

Figure 3 is a view, mainly in section, of a motor-operated valve including a modified form of connecting and sealing means according to the invention.

Referring first to Figs. 1 and 2 of the drawing, the numeral 11 indicates the broken-away upper portion of the casing of a valve of any conventional type having flow-controlling means adapted to be operated by the movement of a connecting rod 12. Secured to the angled projection 13 of the valve casing, by bolts 14 (Fig. 1), is another casing 15 which enhouses an electro-magnetic motor 16, preferably of the high-reactance A. C. type which can be stalled without overheating. The motor is supported in the casing by a pair of plates 17 and 18, the edges of which conform to the casing walls; the right-hand plate 17 being sealingly secured, as by solder 19, and having a depression for receiving the closed end portion 20 of the rotor housing; the left-hand plate 18 having a flanged opening for the other end portion 21 of the rotor housing through which there extends the rotor shaft which carries a driving pinion 22. The leads 23 of the motor are attached to insulated terminals 24, of a sealing type, to the outer ends of which supply wires 25 are connected; this end of the motor casing being covered by a protective housing 26. Meshed with pinion 22 is a gear 27 secured to a shaft 28 journaled in openings in plate 18 and in the left-hand end of the motor casing. Also carried by shaft 28 is a pinion 29 which meshes with a gear 30 secured to the main drive shaft 31 which extends exteriorly of the motor casing through an opening in a boss 32.

The boss 32 is machined to fit snugly within the bore of the valve-casing projection 13 (a shoulder 44 forming a seal between these parts) and carries at its end a cup-washer 33, of leather or the like, which is held in position by the upset extremity 34 of the boss. Rotatable in the bore of the valve-casing extension is a member 35 having an opening for receiving the motor shaft 31, means such as a key 36 providing a driving connection between these parts. At its end within the valve casing the member 35 is provided with a crank-pin 37 for operating the connecting rod 12. A removable plate 38 permits assembly of member 35. The member 35 is also provided with a flange 39 having an annular knife-edge 40 cooperable with a plane surface or seat 41 surrounding the bore of the valve-casing extension.

With the parts in the positions shown in Fig. 2 there is fluid communication between the valve and motor casings through a longitudinal groove 42 in the periphery of member 35 and through a passageway 43 in the boss 32. The length of motor shaft 31 is such that the member 35 is thereby maintained in unseated condition while the valve and motor casings are together.

When the motor 16 is energized, the member 35 is rotated through an angular distance (less than 180°) determined by the particular flow-controlling means connected to the rod 12, the motor stalling when the rod reaches its operated position. When the motor is deenergized, the parts are returned to their normal positions by the force of a spiral spring 45 connected to the shaft 28 and the motor casing.

The motor casing can be removed from the valve casing by unthreading bolts 14 and withdrawing the motor casing and its contents. As the motor casing is withdrawn (assuming that the valve is installed in a fluid control system) the member 35 is forced into seating engagement with the valve casing by the pressure of the fluid therein, the member thus serving as a check valve which seals the valve-casing opening before the boss 32 of the motor casing is fully withdrawn therefrom. The cup-washer 33 prevents escape of fluid before member 35 can reach its seat, and it also serves in a similar manner when the motor casing is reattached.

By the arrangement disclosed in Fig. 2, the need for packed connections is eliminated, and fluid pressure effects such as might be introduced by a bellows seal are also eliminated. The device of the invention has particular utility in refrigerating systems employing conventional fluids which are not injurious to the bearings and gears, or to the motor winding. However, if it is desirable to drain the motor casing so that fluid does not accumulate therein, that casing can readily be inverted.

Referring now to the modified form of the invention shown in Fig. 3, the numeral 51 indicates a valve casing having a partition 52 through which is a valve port 53. Cooperable with the port is a closure member 54 biased by a spring 55 into engagement with an annular seat 56 surrounding the bottom end of the port. Mounted on the top wall of the valve casing is a hollow cylindrical extension 57 into which the stem 58 of the closure member extends through an opening 59 in the casing. The stem 58 is bored to receive the lower end portion 60 of a cylindrical member 61 which is a free sliding fit within the extension 57. The bore 62 of the upper portion of the extension is reduced in diameter to provide a shoulder 63 into seating engagement with which the member 61 is urged by a compression spring 64, there being a lost-motion connection between stem 58 and member 61 to permit simultaneous seating of member 61 and the closure member 54. On top of the casing extension 57 is another extension 65 having a right-angled portion 66 to which is attached a casing 67 containing a motor which is not shown but may be the same as that of Fig. 2. Reciprocable in the bore 62 is a piston 68 which is connected by a rod 69 to a crankpin 70 extending from a member 71 which is rotatable in the bore of portion 66; member 71 being connected by a shaft 72 to the motor.

The parts are shown in unoperated condition in Fig. 3, there being clearance between piston 68 and member 61 so that the bore of extension 57 is sealed by that member and the motor casing 67 (together with extension 65) can be removed without permitting escape of fluid—or of entrance of air if the valve is connected in a refrigerating system wherein pressure conditions are in the directions indicated by the arrow, it being assumed that the force of spring 64 is sufficient to withstand atmospheric pressure on member 61 when the motor casing is removed. When the motor is energized, piston 68 is moved downwardly to operate the closure member 54 through member 61 and stem 58. If flow through the valve were in a direction opposite to that indicated, spring 64 could be dispensed with. Obviously, means other than the motor illustrated could be employed for operating the valve.

The embodiments of the invention herein shown and described are obviously susceptible of modification without departing from the spirit of the invention, and I intend therefore to be limited only by the scope of the appended claims.

I claim as my invention:

1. In combination: a valve casing, means within said casing for controlling fluid flow therethrough, a motor for operating said flow-controlling means, a casing for said motor, means for removably attaching said motor casing to said valve casing, said valve casing having an opening for access to said flow-controlling means and through which opening substantial leakage of fluid can occur, said motor casing having an opening communicating with said valve-casing opening when the casings are together and being otherwise sealed, means extending through said openings for connecting said motor to said flow-controlling means, and means forming a check valve for preventing passage of fluid through said valve-casing opening when the motor casing is removed, said last-mentioned means forming part of said connecting means and serving to transmit the force of said motor to operate the flow-controlling means.

2. In combination: a valve casing, means within said casing for controlling fluid flow therethrough, a motor for operating said flow-controlling means, a casing for said motor, means for removably attaching said motor casing to said valve casing, said valve casing having an opening for access to said flow-controlling means and through which opening substantial leakage of fluid can occur, said motor casing having an opening communicating with said valve-casing opening when the casings are together, the motor casing being otherwise sealed, means extending through said openings for connecting said motor to said flow-controlling means, and a force-transmitting member forming part of said connecting means, said member being arranged to close said valve-casing opening when the motor casing is removed and to establish fluid communication between the casings when the motor casing it attached.

3. In combination: a valve casing, means within said casing for controlling fluid flow therethrough, a motor for operating said flow-controlling means, a casing for said motor, means for removably attaching said motor casing to said valve casing, said valve casing having an opening for access to said flow-controlling means and through which opening substantial leakage of fluid can occur, said motor casing having an opening communicating with said valve-casing opening when the casings are together and being otherwise sealed, means extending through said openings for connecting said motor to said flow-controlling means, means forming a check valve for preventing passage of fluid through said valve-casing opening when the motor casing is removed, said last-mentioned means forming part of said connecting means and serving to transmit the force of said motor to operate the flow-controlling means, and means also forming part of said connecting means for preventing closing of said check valve when the motor casing is attached.

4. In combination: a valve casing, means within said casing for controlling fluid flow therethrough, a motor for operating said flow-controlling means, a casing for said motor, means for removably attaching said motor casing to said valve casing, said valve casing having an opening for access to said flow-controlling means and through which opening substantial leakage of fluid can occur, said motor casing having an opening communicating with said valve-casing opening when the casings are together, the motor casing being otherwise sealed, and means extending through said openings for connecting said motor to said flow-controlling means, said connecting means including a member movable in the operation of the flow-controlling means by the motor, said valve casing providing a seat so engageable by said member when the motor casing is removed that said valve-casing opening is closed, said connecting means also including means for moving said member to open position when the motor casing is attached.

5. In combination: a valve casing; means within said casing for controlling fluid flow therethrough; an electric motor for operating said flow-controlling means; a casing for said motor; means for removably attaching said motor casing to said valve casing; said valve casing having an opening for access to said flow-controlling means and through which opening substantial leakage of fluid can occur; said motor casing having an opening communicating with said valve-casing opening when the casings are together, the motor casing being otherwise sealed; and means extending through said openings for connecting said motor to said flow-controlling means; said connecting means including a member rotatable to transmit the force of said motor to operate said flow-controlling means and reciprocable within the valve casing adjacent said opening therein; said valve casing providing a seat engageable by said member under the pressure of said fluid to close said valve-casing opening when said motor casing is removed; said connecting means also including means for moving said member to open position when the motor casing is attached.

6. The combination defined in claim 5, including means associated with said motor casing for preventing passage of fluid through said valve-casing opening while the motor casing is being attached.

7. In combination: a valve casing, means within said casing for controlling fluid flow therethrough, an electric motor for operating said flow-controlling means, a casing for said motor, means for removably attaching said motor casing to said valve casing, said valve casing having an opening for access to said flow-controlling means and through which opening substantial leakage of fluid can occur, said motor casing having an opening communicating with said valve-casing opening when the casings are together, the motor casing being otherwise sealed, and means extending through said openings for connecting said motor to said flow-controlling means, said connecting means including a member rotatable in said valve-casing opening in the operation of the flow-controlling means and having a flange portion engageable with a seat surrounding the valve-casing opening at the inner end thereof, said member being so reciprocable that it can seat when the motor casing is removed, said connecting means also including means for unseating said member in the attachment of the motor casing.

8. In combination: a valve casing, means within said casing for controlling fluid flow therethrough, said valve casing having an opening communicating with said fluid when said flow-controlling means is in open position, means encompassing said opening and forming an open extension of said valve casing, a movable member controlling fluid communication through said extension and biased to extension-closing position, means forming a connection between said member and said flow-controlling means whereby movement of the member to extension-opening position effects opening of said flow-controlling means, a motor having a casing, means for removably attaching said motor casing to said extension, said motor casing having an opening establishing communication between the motor casing and the extension when the same are interattached, said motor casing being otherwise sealed, and means driven by said motor and extending through said motor-casing opening for moving said member to open position and thereby said flow-controlling means to open position.

WILLIAM A. RAY.

REFERENCES CITED

The following references are of record in the file of this patent:

UNITED STATES PATENTS

| Number | Name | Date |
| --- | --- | --- |
| 916,831 | Bettinger | Mar. 30, 1909 |
| 1,093,514 | Wilson | Apr. 14, 1914 |
| 1,389,056 | Lane | Aug. 30, 1921 |
| 2,152,699 | Kuester | Apr. 4, 1939 |